United States Patent
Zhang et al.

(10) Patent No.: US 11,440,995 B2
(45) Date of Patent: Sep. 13, 2022

(54) METHOD FOR PREPARING ALIPHATIC POLYTHIOETHER

(71) Applicant: ZHEJIANG UNIVERSITY, Hangzhou (CN)

(72) Inventors: Xinghong Zhang, Hangzhou (CN); Chengjian Zhang, Hangzhou (CN)

(*) Notice: Subject to any disclaimer, the term of this patent is extended or adjusted under 35 U.S.C. 154(b) by 0 days.

(21) Appl. No.: 17/233,413

(22) Filed: Apr. 16, 2021

(65) Prior Publication Data
US 2021/0230371 A1    Jul. 29, 2021

Related U.S. Application Data

(63) Continuation of application No. PCT/CN2019/112664, filed on Oct. 23, 2019.

(51) Int. Cl.
   *C08G 75/0209*    (2016.01)
   *C08G 75/0268*    (2016.01)
   *C08G 75/02*    (2016.01)

(52) U.S. Cl.
   CPC ..... *C08G 75/0209* (2013.01); *C08G 75/0268* (2013.01); *C08G 75/0272* (2013.01)

(58) Field of Classification Search
   CPC ............ C08G 75/0209; C08G 75/0268; C08G 75/0272; C08G 64/34; C08G 2170/40; C09J 169/00; C09J 7/38; B65D 33/20; B01J 27/26
See application file for complete search history.

(56) References Cited

U.S. PATENT DOCUMENTS

| | | |
|---|---|---|
| 5,200,501 A | 4/1993 | Kawakami et al. |
| 7,557,235 B2 | 7/2009 | Lai et al. |
| 2009/0312496 A1 | 12/2009 | Lai et al. |
| 2012/0171914 A1 | 7/2012 | Lai et al. |

FOREIGN PATENT DOCUMENTS

| | | | |
|---|---|---|---|
| CN | 103275314 A | 9/2013 | |
| CN | 106243336 A | 12/2016 | |
| CN | 107602528 A | 1/2018 | |
| CN | 108395536 A | 8/2018 | |
| CN | 109180937 A | 1/2019 | |
| JP | 11292969 | * 10/1999 | ............. C08G 75/28 |

OTHER PUBLICATIONS

Sato et al, Sato et al. (Derwent 1981-53929D), Jun. 5, 1981.*
(Continued)

*Primary Examiner* — Shane Fang

(57) ABSTRACT

A method for preparing aliphatic polythioether is provided. In the method, aliphatic polythioether is obtained by polymerization reaction using a sulfur-carbon compound and an oxygen-containing monomer as raw materials and using Lewis base as a catalyst, and the polymerization reaction is performed under a self-generated pressure at 80~180° C. Based on the defects of the traditional preparation process of aliphatic polythioether, a bran-new synthetic routine is provided, in which a new process for preparing polythioether in one-pot reaction is achieved through oxygen-sulfur exchange reaction between the sulfur-carbon compound and the oxygen-containing monomer.

5 Claims, 5 Drawing Sheets

(56) References Cited

OTHER PUBLICATIONS

Internation Search Report of PCT/CN2019/112664, dated Jan. 17, 2020.
M. Luo et al., "Synthesis of cyclic monothiocarbonates via the coupling reaction of carbonyl sulfide (COS) with epoxides", «Catalysis Science & Technology», vol. 6, Dec. 31, 2016, pp. 188-192.
Yang Rui et al., "Progress in synthesis and ring-opening polymerization of aliphatic cyclic carbonate", «Chemical Industry and Engineering Progress», vol. 29, No. 10, Dec. 31, 2010, pp. 1917-1922 and 1974.

* cited by examiner

METHOD FOR PREPARING ALIPHATIC POLYTHIOETHER

CROSS-REFERENCE TO RELATED APPLICATIONS

This application is a continuation of International Patent Application No. PCT/CN2019/112664 with a filing date of Oct. 23, 2019, designating the United States and further claims priority to Chinese Patent Application No. 201811284075.1 with a filing date of Oct. 31, 2018. The content of the aforementioned applications, including any intervening amendments thereto, are incorporated herein by reference.

TECHNICAL FIELD

The disclosure belongs to the field of polymer material synthesis, and particularly relates to a method for preparing aliphatic polythioether.

BACKGROUND OF THE PRESENT INVENTION

Aliphatic polythioether is a sulfur-containing polymer having excellent optical performance, good chemical stability, and good heavy metal ion absorption capability, and has a broad application prospect in the aspects of high-performance optical fiber manufacturing, binders and heavy metal ion-containing wastewater treatment. Typically, the aliphatic polythioether is prepared by ring-opening polymerization of episulfides. However, synthesis of episulfide is typically achieved by reacting dithiol with phosgene or chloroform in an organic solvent. Since the used raw materials such as phosgene, chloroform and the solvent have toxicity, this synthetic routine hardly has an existing value. Another method for synthesis of aliphatic polythioether is achieved by Michael addition of dithiol and dialkene. The free radical addition method is adopted, which is efficient and has many side reactions, and is uneasy to control in molecular weight and its distribution of a product.

For example, Chinese patent application CN 105189611A discloses a composition that can be cured into polythioether polymer by radiation. The composition comprises at least one dithiol monomer, at least one diene monomer, at least one multifunctional monomer having at least three vinyl groups and at least one photoinitiator, and is cured by radiation to form a polythioether polymer.

For another example, Chinese patent application CN 107312174 A discloses a synthesis method of polythioether. In this method, a dimercapto-alkene photopolymerization reaction system using a benzaldehyde derivative as a catalyst consists of α, ω-dimercapto compound and α, ω-divinyl ether as monomers. The polymerization reaction is carried out under visible light irradiation for 2-10 h, and the reaction temperature is room temperature for synthesis of polythioether.

However, the raw material monomers, such as dithiol, dimercapto compounds, dialkene and the like, used in the above technical solutions are usually difficult to prepare, expensive in price and limited in variety, which limits the industrial application of such traditional synthetic methods.

The Chinese patent application CN 106866952 A discloses a method for preparing polymonothiocarbonate. In this method, a sulfur oxide and an oxygen-containing monomer are used as raw materials, and a catalytic system composed of an initiator and a Lewis acid is used, polymonothiocarbonate is obtained by bulk polymerization or solution polymerization. The initiator is selected from quaternary ammonium salts, quaternary phosphonium salts or organic bases. This technical solution is the result of the previous research of the inventor of the disclosure. By adopting a catalytic system with special compositions and fully inhibiting the occurrence of the oxygen-sulfur exchange reaction, a polymonothiocarbonate with a clear chain structure can be prepared.

SUMMARY OF PRESENT INVENTION

Based on the defects of the traditional preparation process for aliphatic polythioether, the disclosure provides a bran-new synthetic routine, which is low in raw material cost, and can prepare aliphatic polythioether whose polymer chains are all composed of thioether chain units, with adjustable molecular weight and narrow molecular weight distribution of the product.

The specific technical solution is as follows:

A method for preparing aliphatic polythioether, which is obtained by polymerization reaction using a sulfur-carbon compound and an oxygen-containing monomer as raw materials and using a Lewis base as a catalyst;

the polymerization reaction is performed under a self-generated pressure at 80~180° C.

When deeply researching the preparation of polythiocarbonate by polymerization of a sulfur-carbon compound and an oxygen-containing monomer, the inventor surprisingly finds that by using a Lewis base as a catalyst and then regulating the temperature of the polymerization reaction to 80~180° C., occurrence of thermodynamic-favorable oxygen-sulfur exchange reaction is achieved at high temperature, and the oxygen-sulfur exchange reaction is converted into a main reaction, and then the aliphatic polythioether whose polymer chains are all composed of thioether chain units is prepared by regulating the amount ratio of the sulfur-carbon compound to the oxygen-containing monomer and the catalyst, so as to prepare the aliphatic polythioether whose polymer chains are all composed of thioether chain units.

Via test, it is found that if a double-component catalysis system composed of a Lewis base and a Lewis acid is used, the prepared product is polythiocarbonate, which is a synthetic routine made based on the thinking of inhibiting oxygen-sulfur exchange reaction.

If the temperature of the polymerization reaction is controlled below 80° C., aliphatic polythioether whose polymer chains are all composed of thioether chain units cannot be prepared; further, a catalytic reaction dynamic research shows that when oxygen-sulfur exchange smoothly occurs, two five-membered cyclic products, namely cyclic monothiocarbonate and cyclic dithiocarbonate, are mainly generated in the system, wherein cyclic monothiocarbonate is a main cyclic product. When the polymerization temperature is slightly low, 80~130° C., it is needed to seriously control the ratios of raw materials, the molar ratio of the sulfur-carbon compound to the oxygen-containing monomer is 1~5:1, and the molar ratio of the catalyst to the oxygen-containing monomer is 1:50~500, the two five-membered cyclic products can undergo ring-opening reaction to obtain polythioether while removing carbon dioxide (or carbon oxysulfide). For this, there are two main reasons, one reason is that when the concentration of the catalyst is relatively high, it is dynamically beneficial to the reaction; the other reason that thermodynamically, the process of removing small molecules is a process of entropy production, which compensates for entropy reduction generated when polymerization reaction occurs, so as to promote the smooth proceeding of the reaction, and is an entropy-driven polymerization reaction. Thus, when polymerization occurs within a higher range, that is, the process of removing small molecules is more beneficial to reaction under the condition that reaction energy is supplied more sufficiently. Meanwhile, the molar ratio of the sulfur-carbon compound to the oxygen-containing monomer is relatively small, which is also beneficial to release of small molecules so as to pull the reaction toward a direction of polymer generation. It is noted that the oxygen-sulfur exchange reaction here is just achieved by ring-opening reaction of five-membered thiocarbonate. It is observed by experiments that polymerization reaction is easier to occur at the temperature of 130~180° C., exhibiting that polymerization activity is further improved. The screening result shows the molar ratio of the sulfur-carbon compound to the oxygen-containing monomer is expanded to 1~10:1, the molar ratio of the catalyst to the oxygen-containing monomer is expanded to 1:10~5000, and the polymerization reaction smoothly occurs.

That is to say,

When the polymerization reaction is performed under the self-generated pressure at 130~180° C., the molar ratio of the sulfur-carbon compound to the oxygen-containing monomer is 1~10:1, the molar ratio of the catalyst to the oxygen-containing monomer is 1:10~5000.

When the polymerization reaction is performed under the self-generated pressure at 80~130° C., the molar ratio of the sulfur-carbon compound to the oxygen-containing monomer is 1~5:1, and the molar ratio of the catalyst to the oxygen-containing monomer is 1:50~500.

The preparation method of the disclosure has good adaptability, and can be suitable for multiple monomer raw materials, specifically:

The sulfur-carbon compound is selected from at least one of carbon disulfide and carbon oxysulfide;

the oxygen-containing monomer is selected from at least one of epoxide, oxetane and 3-substituted oxetane;

the epoxide is selected from at least one of ethylene oxide, propylene oxide, 1,2-epoxybutane, $C_5$-$C_{20}$ α-oxyalkylene, epoxy methyl undecylenate, allyl glycidyl ether, epichlorohydrin, epoxyisobutane, epoxycyclohexane, 4-vinyl epoxycyclohexane, glycidyl methacrylate, limonene oxide, epoxycyclopentane and styrene oxide;

the oxetane is a four-membered heterocyclic compound, also called 1,3-epoxypropane with a chemical formula $C_3H_6O$;

the 3-substituted oxetane is selected from at least one of 3,3-dimethyl oxetane, 3-methyl-3-benzyloxymethyl oxetane, 3-chloromethyl-3-methyl oxetane, 3-methyl-3-oxetane methanol, 3-oxetanone, 3-(allyloxy)oxetane and 3-bromooxetane;

preferably, the molar ratio of the sulfur-carbon compound to the oxygen-containing monomer is (1~5):1.

When the sulfur-carbon compound is selected from carbon oxysulfide, the molar ratio of the carbon oxysulfide to the oxygen-containing monomer is more preferably 1~2:1. Via test, it is found that under this ratio condition, the five-membered ring thiocarbonate can be rapidly generated, further ring-opening reaction of cyclic thiocarbonate is more facilitated after carbon oxysulfide is consumed so as to generate polythioether, the polymerization reaction rate is rapid as a whole, and polythioether with a high molecular weight is obtained in most cases.

When the sulfur-carbon compound is selected from carbon disulfide, the molar ratio of the carbon disulfide to the oxygen-containing monomer is 2~5:1. Via test, it is found that the five-membered cyclic dithiocarbonate can be rapidly generated, polythioether is generated while carbon oxysulfide is removed through ring-opening reaction, thereby quickening the whole polymerization rate. A proper amount of carbon disulfide facilitates carbon oxysulfide generated by dissolution, and therefore the preferred molar ratio of the carbon disulfide to the oxygen-containing monomer is 2~5:1 is a resulted in integrating raw material concentration, process and self-generated pressure composite factor of the system.

In the disclosure, the Lewis base is selected from at least one of quaternary ammonium salts, quaternary phosphonium salts, organic amines and alkali metal alkoxides;

the quaternary ammonium salt is selected from at least one of bis (triphenylphosphoranyl) ammonium chloride, cetyltrimethyl ammonium halide, tetrabutyl ammonium hydroxide, dodecyltrimethyl ammonium halide, decadecyltrimethyl ammonium halide, benzyltriethyl ammonium halide, benzyltripropyl ammonium halide, benzyltributyl ammonium halide, benzyltriethylammonium acetate, benzyltripropyl ammonium acetate, benzyltributyl ammonium acetate, tetraethyl ammonium acetate, tetrabutyl ammonium nitrate, tetrapropyl ammonium acetate and tetraalkyl ammonium halide;

the quaternary phosphonium salt is selected from at least one of tetraphenyl phosphonium chloride, tetraphenyl phosphonium bromide, tetraalkyl phosphonium halide, benzyltriphenyl phosphine bromide, butyltriphenyl phosphine iodide and propyltriphenyl phosphine bromide;

the organic amine is selected from at least one of 1-tert-butyl-2,2,4,4,4-penta (dimethylamino)-2Λ5,4Λ5-bis (phosphorus nitrogen compound), N'-tert-butyl-N,N,N',N',N'',N'', N''-hexamethyl iminophosphatamide, 1,8-diazabicyclo [5.4.0]undec-7-ene, 7-methyl-1,5,7-triazabicyclo[4.4.0] deca-5-ene, 4-(dimethylamino)pyridine, 1,3-diaza-2,4-cyclopentadiene;

the alkali metal alkoxide is selected from at least one of sodium methoxide, potassium methoxide, lithium methoxide, sodium ethoxide, potassium ethoxide, lithium ethoxide, potassium tert-butanol, lithium tert-butanol and sodium tert-butanol.

Preferably, the catalyst is selected from at least one of bis (triphenylphosphoranyl) ammonium chloride ([PPN]Cl), dodecyltrimethyl ammonium bromide (DTMeAB), tetraphenyl phosphonium chloride (PPh$_4$Cl), 1,8-diazabicyclo [5.4.0]undec-7-ene (DBU), sodium methoxide (CH$_3$ONa) and potassium tert-butoxide (CH$_3$ONa).

Preferably, the molar ratio of the catalyst to the oxygen-containing monomer is 1:50~500. Within a preferred range, the concentration range of the catalyst can ensure the polymerization reaction can be rapidly and stably performed to obtain products with mediate and high molecular weights, polymers at these intervals often have comprehensive mechanical and thermal properties. Because the used Lewis base takes effects in two aspects during the reaction, in one aspect, the Lewis base functions as the catalyst; in the other aspect, the Lewis base functions as an initiator (in polymer synthesis, the catalyst and the initiator are universal) during the ring opening, that is to say, some Lewis bases can be retained on the end group of the polymer, which is verified by time-of-flight mass spectrometry results.

In the disclosure, the method for preparing aliphatic polythioether specifically comprises:

the polymerization reaction is performed in an autoclave under dry and oxygen-free conditions using the sulfur-carbon compound and the oxygen-containing monomer as polymerization monomers and using the Lewis base as the catalyst, followed by adding an alcohol-hydrochloric acid solution and posttreating to obtain the aliphatic polythioether.

The polymerization reaction is bulk polymerization or solution polymerization; if the polymerization reaction is solution polymerization, a solvent is selected from at least one of dichloromethane, chloroform, tetrahydrofuran, toluene, trichlorobenzene, o-dichlorobenzene, m-dichlorobenzene, p-dichlorobenzene and dimethylformamide.

In the preparation method of the disclosure, oxygen-sulfur exchange reaction occurs under the condition of more than 80° C. Preferably, the polymerization reaction is performed under the self-generated pressure at 130~180° C. Via test, it is found that under the above preferred polymerization reaction temperature, oxygen-sulfur exchange reaction is more sufficient, the prepared aliphatic polythioether has high molecular weight and narrow molecular weight distribution.

Under the above preferred process conditions, further preferably:

The oxygen-containing monomer is selected from propylene oxide, ethylene oxide, cyclohexane oxide, phenyl glycidyl ether, benzyl glycidyl ether, styrene oxide, oxetane and 3,3-dimethyl oxetane, 3-methyl-3-benzyloxymethyl oxetane or 3-chloromethyl-3-methyl oxetane; further preferably, the oxygen-containing monomer is selected from epoxipropane, ethylene oxide, oxetane or 3-chloromethyl-3-methyl oxetane.

The solvent is selected from tetrahydrofuran, trichlorobenzene, dimethylformamide or toluene;

More further preferably:

The molar ratio of the catalyst to the oxygen-containing monomer is 1:50~500, the molar ratio of the carbon oxysulfide to the oxygen-containing monomer is 1~2:1, the molar ratio of the carbon disulfide to the oxygen-containing monomer is 2~5:1; the polymerization reaction is performed under the self-generated pressure at 130~180° C.

By adopting the above process conditions, the oxygen-containing monomer can be completely converted, the prepared aliphatic polythioether has number-average molecular weight of 10~100 kg/mol and molecular weight distribution of 1.1~1.5.

Compared with the prior art, the disclosure has the following beneficial effects:

(1) On the basis of a large number of experimental studies, the disclosure proposes a bran-new aliphatic polythioether synthesis route, and a new process for preparing polythioether in one-pot reaction is achieved by utilizing oxygen-sulfur exchange reaction between the sulfur-carbon compound and the oxygen-containing monomer. Compared with the previously reported synthesis method, the monomer in this process route is cheap and easily available;

(2) The catalysts used in the disclosure are all common chemicals that are relatively low in price. Meanwhile, the catalyst is easily separated from the polymer without complicated post-treatment and purification steps and with a great industrial application value;

(3) By adopting the synthesis method, the variety of oxygen-containing monomers is complete and the synthesis method has good universality, the variety of the prepared aliphatic polythioether is rich, which is conducive to expanding the new application of aliphatic polythioether.

DETAILED DESCRIPTION OF PREFERRED EMBODIMENTS

For better specifically describing the disclosure, the technical solution of the disclosure will be described in detail in combination with drawings and specific embodiments.

In the disclosure, the used catalyst has the following structure, the numbers of initiators having different structures are as shown in the following formulas.

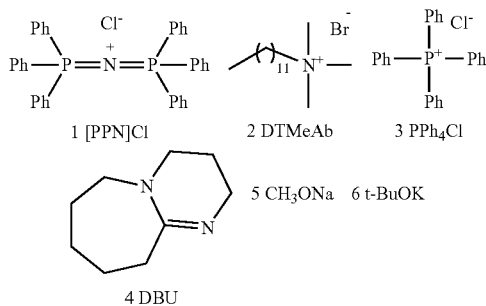

Comparative Example 1 COS/PO Copolymerization

Figure 1:
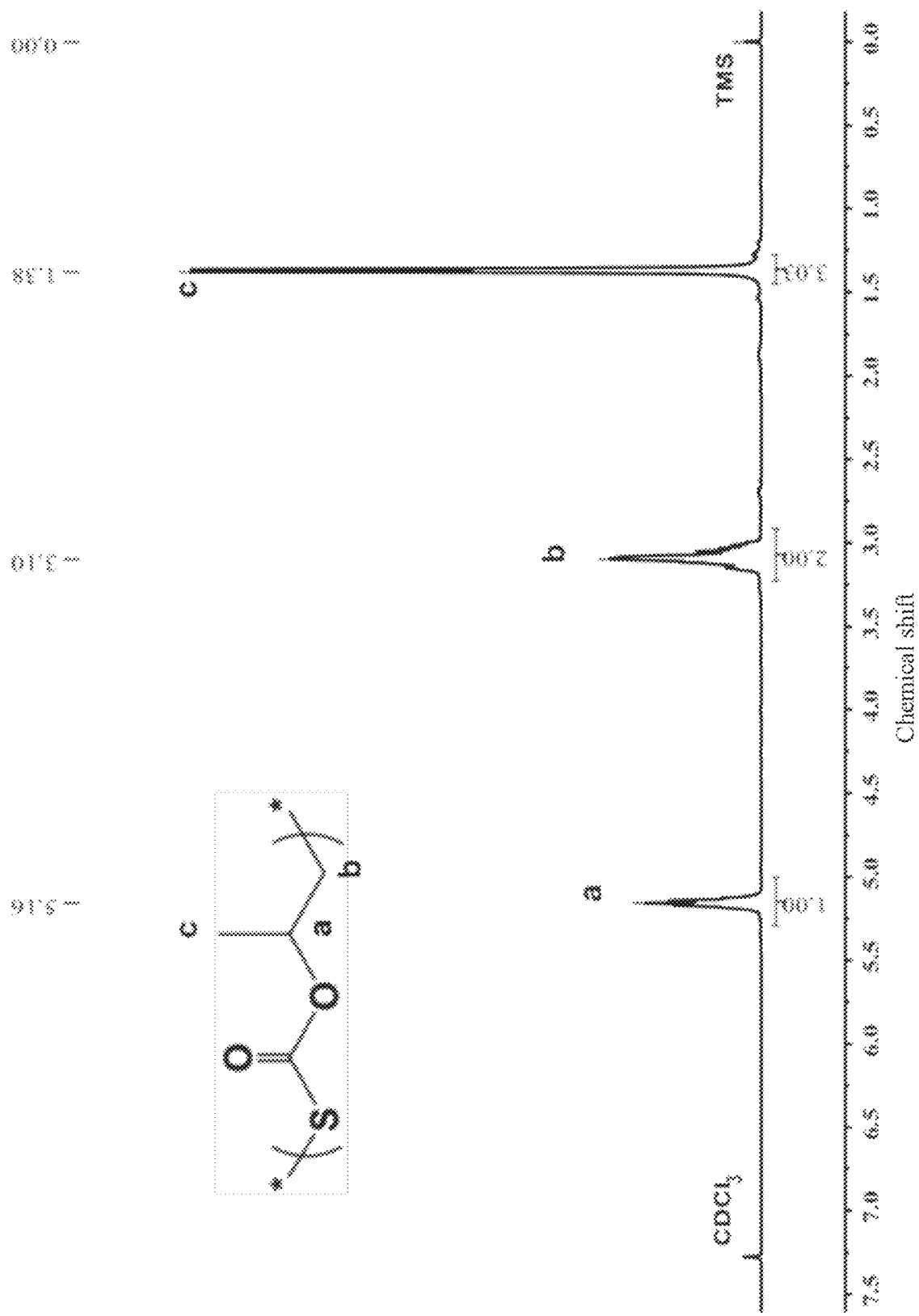
FIG. 1 is a $^1$H NMR spectrum of polythioether prepared in comparative example 1.

Before polymerization reaction, water in a 10 mL autoclave was removed at 110V for about 2 hours, and the autoclave was cooled to room temperature in a dryer; certain amounts of catalyst 1 bis(triphenylphosphoranyl) ammonium chloride ([PPN]Cl) were added to the autoclave in sequence; a molar ratio of the catalyst f to propylene oxide (PO) was 1/50; then COS, PO (a molar ratio of COS to PO was 2:1) and 1 mL tetrahydrofuran (THF) were added. Then, the autoclave was closed and put into 60° C. oil bath to react for 24 h under the self-generated pressure. After the reaction was ended, the autoclave was cooled to room temperature. The crude product was dissolved with tetrahydrofuran, and then the polymer was precipitated out in the mixture of ethanol/deionized water/hydrochloric acid. The polymer was repeatedly washed three times and dried in vacuum to constant weight. The molecular weight and molecular weight distribution of the polymer were determined by gel chromatography. The test results are shown in Table 1, The $^1$H NMR spectrum of the polymer prepared in this comparative example is as shown in FIG. 1. It can be seen from FIG. 1 that the polymerized product is polymonothiocarbonate, and polythioether is not produced, FIG. 1 also shows the peak position and integral area of each hydrogen atom on the chain unit of monothiocarbonate.

Example 1 Synthesis of Polythioether from COS/PO

Before polymerization reaction, water in a 10 mL autoclave was removed at 110° C. for about 2 hours, and the autoclave was cooled to room temperature in a dryer; certain amounts of catalyst f bis(triphenylphosphoranyl) ammonium chloride ([PPN]Cl) were added to the autoclave in sequence; a molar ratio of the catalyst 1 to propylene oxide (PO) was 1/50; then COS, PO (a molar ratio of COS to PO was 2:1) and 1 mL tetrahydrofuran (THF) were added. Then, the autoclave was closed and put into 80° C. oil bath to react for 5 h under the self-generated pressure. After the reaction was ended, the autoclave was cooled to room temperature. The crude product was dissolved with tetrahydrofuran, and then the polymer was precipitated out in the mixture of ethanol/deionized water/hydrochloric acid. The polymer was repeatedly washed three times and dried in vacuum to constant weight. The molecular weight and molecular weight distribution of the polymer were determined by gel chromatography. The test results are shown in Table 1.

Figure 2:
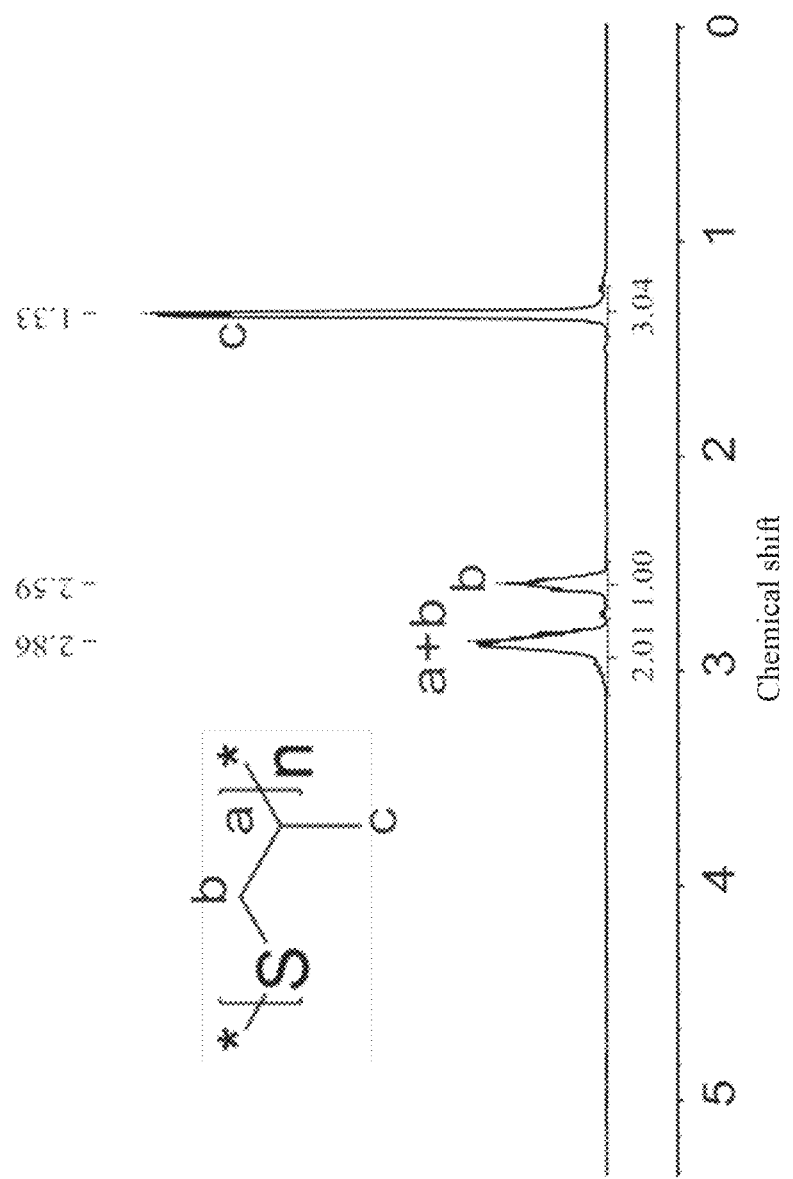
FIG. 2 is a $^1$H NMR spectrum of polythioether prepared in example 1.
Figure 3:
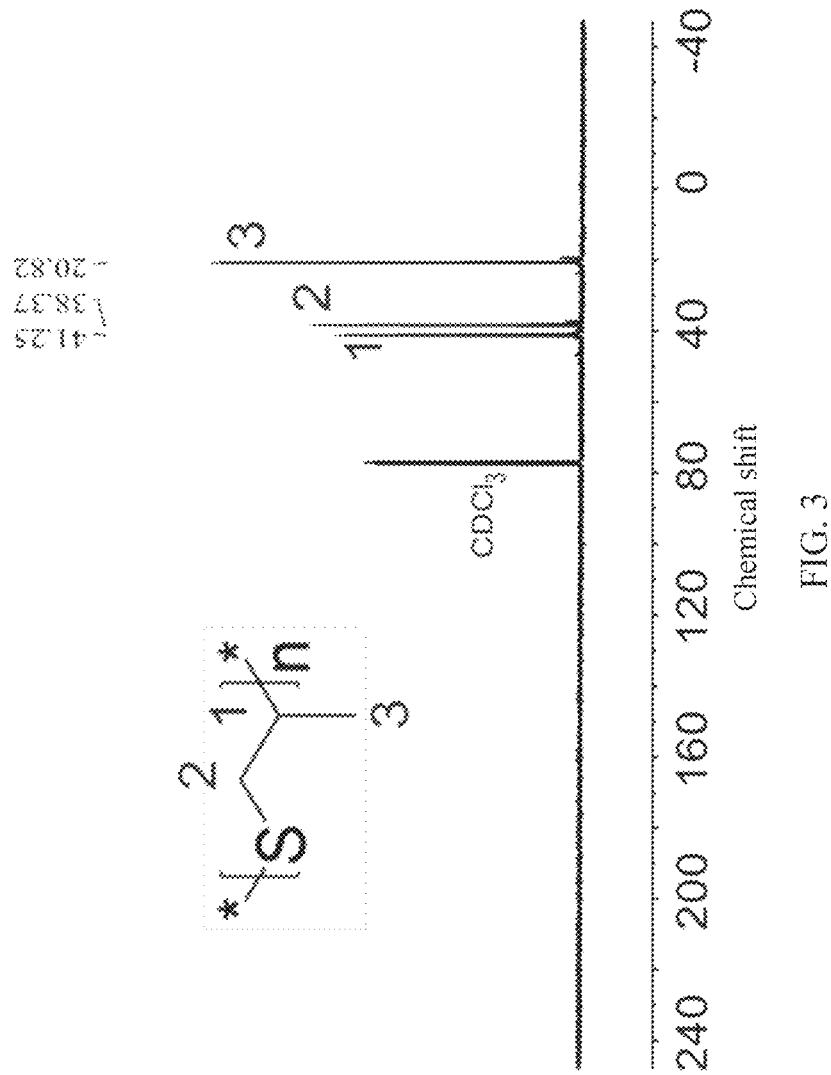
FIG. 3 is a $^{13}$C NMR spectrum of polythioether prepared in example 1.

The $^1$H NMR spectrum of the polymer prepared in this example is as shown in FIG. 2, and $^{13}$C NMR spectrum of the polymer prepared in this example is as shown in FIG. 3. It can be seen from FIG. 2 and FIG. 3 that polythioether is successfully synthesized; FIG. 2 also shows the peak position and integral area of each hydrogen atom on the chain unit of thioether.

Example 2 Synthesis of Polythioether from $CS_2$/PO

Before polymerization reaction, water in a 10 mL autoclave was removed at 110° C. for about 2 hours, and the autoclave was cooled to room temperature in a dryer; certain amounts of catalyst 2 dodecyltrimethyl ammonium bromide (DTMeAB) were added to the autoclave in sequence; a molar ratio of the catalyst 2 to propylene oxide (PO) was 1/500; then $CS_2$, PO (a molar ratio of $CS_2$ to PO was 2:1) and 1 mL tetrahydrofuran (THF) were added. Then, the autoclave was closed and put into 80° C. oil bath to react for 2 h under the self-generated pressure. After the reaction was ended, the autoclave was cooled to room temperature. The crude product was dissolved with tetrahydrofuran, and then the polymer was precipitated out in the mixture of ethanol/deionized water/hydrochloric acid. The polymer was repeatedly washed three times and dried in vacuum to constant weight. The molecular weight and molecular weight distribution of the polymer were determined by gel chromatography. The test results are shown in Table 1.

Example 3 Synthesis of Polythioether from $CS_2$/PO

Before polymerization reaction, water in a 10 mL autoclave was removed at 110° C. for about 2 hours, and the autoclave was cooled to room temperature in a dryer; certain amounts of catalyst 2 dodecyltrimethyl ammonium bromide (DTMeAB) were added to the autoclave in sequence; a molar ratio of the catalyst 2 to propylene oxide (PO) was 1/500; then $CS_2$, PO (a molar ratio of $CS_2$ to PO was 2:1) and 1 mL tetrahydrofuran (THF) were added. Then, the autoclave was closed and put into 130° C. oil bath to react for 2 h under the self-generated pressure. After the reaction was ended, the autoclave was cooled to room temperature. The crude product was dissolved with tetrahydrofuran, and then the polymer was precipitated out in the mixture of ethanol/deionized water/hydrochloric acid. The polymer was repeatedly washed three times and dried in vacuum to constant weight. The molecular weight and molecular weight distribution of the polymer were determined by gel chromatography. The test results are shown in Table 1.

Example 4 Synthesis of Polythioether from $CS_2$/PO

Before polymerization reaction, water in a 10 mL autoclave was removed at 110° C. for about 2 hours, and the autoclave was cooled to room temperature in a dryer; certain amounts of catalyst 2 dodecyltrimethyl ammonium bromide (DTMeAB) were added to the autoclave in sequence; a molar ratio of the catalyst 2 to propylene oxide (PO) was 1/500; then $CS_2$, PO (a molar ratio of $CS_2$ to PO was 10:1) and 1 mL tetrahydrofuran (THF) were added. Then, the autoclave was closed and put into 130° C. oil bath to react for 2 h under the self-generated pressure. After the reaction was ended, the autoclave was cooled to room temperature. The crude product was dissolved with tetrahydrofuran, and then the polymer was precipitated out in the mixture of ethanol/deionized water/hydrochloric acid. The polymer was repeatedly washed three times and dried in vacuum to constant weight. The molecular weight and molecular weight distribution of the polymer were determined by gel chromatography. The test results are shown in Table 1.

Example 5 Synthesis of Polythioether from $CS_2$/PO

Before polymerization reaction, water in a 10 mL autoclave was removed at 110° C. for about 2 hours, and the autoclave was cooled to room temperature in a dryer; certain amounts of catalyst 2 dodecyltrimethyl ammonium bromide (DTMeAB) were added to the autoclave in sequence; a molar ratio of the catalyst 2 to propylene oxide (PO) was 1/10; then $CS_2$, PO (a molar ratio of $CS_2$ to PO was 2:1) and 1 mL tetrahydrofuran (THF) were added. Then, the autoclave was closed and put into 130° C. oil bath to react for 2 h under the self-generated pressure. After the reaction was ended, the autoclave was cooled to room temperature. The crude product was dissolved with tetrahydrofuran, and then the polymer was precipitated out in the mixture of ethanol/deionized water/hydrochloric acid. The polymer was repeatedly washed three times and dried in vacuum to constant weight. The molecular weight and molecular weight distribution of the polymer were determined by gel chromatography. The test results are shown in Table 1.

Example 6 Synthesis of Polythioether from COS/PO

Before polymerization reaction, water in a 10 mL autoclave was removed at 110° C. for about 2 hours, and the autoclave was cooled to room temperature in a dryer; certain amounts of catalyst 3 tetraphenyl phosphonium chloride ($PPh_4Cl$) were added to the autoclave in sequence; a molar ratio of the catalyst 3 to propylene oxide (PO) was 1/250; then COS, PO (a molar ratio of COS to PO was 2:1) and 1 mL tetrahydrofuran (THF) were added. Then, the autoclave was closed and put into 150° C. oil bath to react for 1 h under the self-generated pressure. After the reaction was ended, the autoclave was cooled to room temperature. The crude product was dissolved with tetrahydrofuran, and then the polymer was precipitated out in the mixture of ethanol/deionized water/hydrochloric acid. The polymer was repeatedly washed three times and dried in vacuum to constant weight. The molecular weight and molecular weight distribution of the polymer were determined by gel chromatography. The test results are shown in Table 1.

Example 7 Synthesis of Polythioether from COS/PO

Before polymerization reaction, water in a 10 mL autoclave was removed at 110° C. for about 2 hours, and the autoclave was cooled to room temperature in a dryer; certain amounts of catalyst 4 1,8-diazabicyclo[5.4.0]undec-7-ene (DBU) were added to the autoclave in sequence; a molar ratio of the catalyst 4 to propylene oxide (PO) was 1/100; then COS, PO (a molar ratio of COS to PO was 1:1) and 1 mL dimethylformamide (DMF) were added. Then, the autoclave was closed and put into 150° C. oil bath to react for 2 h under the self-generated pressure. After the reaction was ended, the autoclave was cooled to room temperature. The crude product was dissolved with tetrahydrofuran, and then the polymer was precipitated out in the mixture of ethanol/deionized water/hydrochloric acid. The polymer was repeatedly washed three times and dried in vacuum to constant weight. The molecular weight and molecular weight distribution of the polymer were determined by gel chromatography. The test results are shown in Table 1.

Example 8 Synthesis of Polythioether from COS/PO

Before polymerization reaction, water in a 10 mL autoclave was removed at 110° C. for about 2 hours, and the autoclave was cooled to room temperature in a dryer; certain amounts of catalyst 5 sodium methoxide ($CH_3ONa$) were added to the autoclave in sequence; a molar ratio of the catalyst 5 to propylene oxide (PO) was 1/50; then COS and PO (a molar ratio of COS to PO was 2:1) were added. Then, the autoclave was closed and put into 180° C. oil bath to react for 0.5 h under the self-generated pressure. After the reaction was ended, the autoclave was cooled to room temperature. The crude product was dissolved with tetrahydrofuran, and then the polymer was precipitated out in the mixture of ethanol/deionized water/hydrochloric acid. The polymer was repeatedly washed three times and dried in vacuum to constant weight. The molecular weight and molecular weight distribution of the polymer were determined by gel chromatography. The test results are shown in Table 1.

Example 9 Synthesis of Polythioether from $CS_2$/PO

Before polymerization reaction, water in a 10 mL autoclave was removed at 110° C. for about 2 hours, and the autoclave was cooled to room temperature in a dryer; certain amounts of catalyst 6 potassium tert-butoxide (t-BuOK) were added to the autoclave in sequence; a molar ratio of the catalyst 6 to propylene oxide (PO) was 1/5000; then $CS_2$, PO (a molar ratio of $CS_2$ to PO was 2:1) and 1 mL tetrahydrofuran (THF) were added. Then, the autoclave was closed and put into 130° C. oil bath to react for 12 h under the self-generated pressure. After the reaction was ended, the autoclave was cooled to room temperature. The crude product was dissolved with tetrahydrofuran, and then the polymer was precipitated out in the mixture of ethanol/deionized water/hydrochloric acid. The polymer was repeatedly washed three times and dried in vacuum to constant weight. The molecular weight and molecular weight distribution of the polymer were determined by gel chromatography. The test results are shown in Table 1.

Example 10 Synthesis of Polythioether from $CS_2$/CHO

Before polymerization reaction, water in a 10 mL autoclave was removed at 110° C. for about 2 hours, and the autoclave was cooled to room temperature in a dryer; certain amounts of catalyst 6 potassium tert-butoxide (t-BuOK) were added to the autoclave in sequence; a molar ratio of the catalyst 6 to cyclohexene oxide (CHO) was 1/500; then $CS_2$, CHO (a molar ratio of $CS_2$ to CHO was 5:1) and 1 mL tetrahydrofuran (THF) were added. Then, the autoclave was closed and put into 150° C. oil bath to react for 8 h under the self-generated pressure. After the reaction was ended, the autoclave was cooled to room temperature. The crude product was dissolved with tetrahydrofuran, and then the polymer was precipitated out in the mixture of ethanol/deionized water/hydrochloric acid. The polymer was repeatedly washed three times and dried in vacuum to constant weight. The molecular weight and molecular weight distribution of the polymer were determined by gel chromatography. The test results are shown in Table 1.

Figure 4:
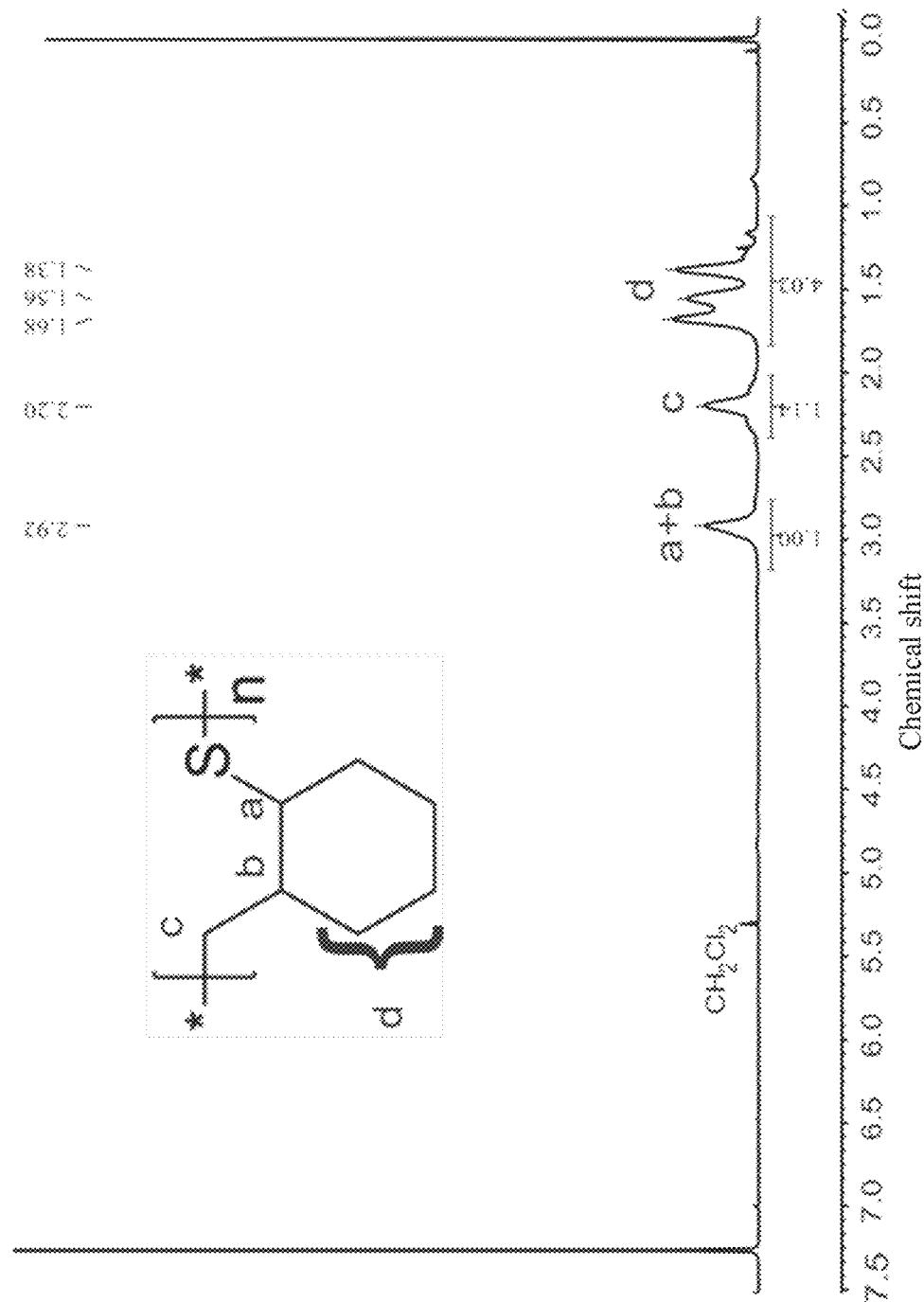
FIG. 4 is a $^1$H NMR spectrum of polythioether prepared in example 10.

The $^1H$ NMR spectrum of the polythioether prepared in this example is as shown in FIG. 4. It can be seen from FIG. 4 that polythioether is successfully synthesized; FIG. 4 also shows the peak position and integral area of each hydrogen atom on the chain unit of thioether.

Example 11 Synthesis of Polythioether from $CS_2$/PGE

Before polymerization reaction, water in a 10 mL autoclave was removed at 110° C. for about 2 hours, and the autoclave was cooled to room temperature in a dryer; certain amounts of catalyst 1 bis(triphenylphosphoranyl) ammonium chloride ([PPN]Cl) were added to the autoclave in sequence; a molar ratio of the catalyst 1 to phenyl glycidyl ether (PGE) was 1/500; then $CS_2$, PGE (a molar ratio of $CS_2$ to PGE was 2:1) and 1 mL tetrahydrofuran (THF) were added. Then, the autoclave was closed and put into 150° C. oil bath to react for 8 h under the self-generated pressure. After the reaction was ended, the autoclave was cooled to room temperature. The crude product was dissolved with tetrahydrofuran, and then the polymer was precipitated out in the mixture of ethanol/deionized water/hydrochloric acid. The polymer was repeatedly washed three times and dried in vacuum to constant weight. The molecular weight and molecular weight distribution of the polymer were determined by gel chromatography. The test results are shown in Table 1.

Example 12 Synthesis of Polythioether from COS/StO

Before polymerization reaction, water in a 10 mL autoclave was removed at 110° C. for about 2 hours, and the autoclave was cooled to room temperature in a dryer; certain amounts of catalyst 2 dodecyltrimethyl ammonium bromide (DTMeAB) were added to the autoclave in sequence; a molar ratio of the catalyst 2 to styrene oxide (StO) was 1/500; then COS, StO (a molar ratio of COS to StO was 2:1) and 1 mL dimethylformamide (THF) were added. Then, the autoclave was closed and put into 150° C. oil bath to react for 12 h under the self-generated pressure. After the reaction was ended, the autoclave was cooled to room temperature. The crude product was dissolved with tetrahydrofuran, and then the polymer was precipitated out in the mixture of ethanol/deionized water/hydrochloric acid. The polymer was repeatedly washed three times and dried in vacuum to constant weight. The molecular weight and molecular weight distribution of the polymer were determined by gel chromatography. The test results are shown in Table 1.

Example 13 Synthesis of Polythioether from $CS_2$/E0

Before polymerization reaction, water in a 10 mL autoclave was removed at 110° C. for about 2 hours, and the autoclave was cooled to room temperature in a dryer; certain amounts of catalyst 2 dodecyltrimethyl ammonium bromide (DTMeAB) were added to the autoclave in sequence; a molar ratio of the catalyst 2 to ethylene oxide (EO) was 1/500; then $CS_2$, EO (a molar ratio of $CS_2$ to EO was 5:1) and 1 mL trichlorobenzene were added. Then, the autoclave was closed and put into 160° C. oil bath to react for 10 h under the self-generated pressure. After the reaction was ended, the autoclave was cooled to room temperature. The crude product was dissolved with tetrahydrofuran, and then the polymer was precipitated out in the mixture of ethanol/deionized water/hydrochloric acid. The polymer was repeatedly washed three times and dried in vacuum to constant weight. The molecular weight and molecular weight distribution of the polymer were determined by gel chromatography. The test results are shown in Table 1.

Example 14 Synthesis of Polythioether from COS/Benzyl Glycidyl Ether

Before polymerization reaction, water in a 10 mL autoclave was removed at 110° C. for about 2 hours, and the autoclave was cooled to room temperature in a dryer; certain amounts of catalyst 1 bis(triphenylphosphoranyl) ammonium chloride ([PPN]Cl) were added to the autoclave in sequence; a molar ratio of the catalyst 1 to benzyl glycidyl ether was 1/500; then COS, benzyl glycidyl ether (a molar ratio of COS to benzylglycidyl ether was 1:1) and 1 mL toluene were added. Then, the autoclave was closed and put into 150° C. oil bath to react for 8 h under the self-generated pressure. After the reaction was ended, the autoclave was cooled to room temperature. The crude product was dissolved with tetrahydrofuran, and then the polymer was precipitated out in the mixture of ethanol/deionized water/hydrochloric acid. The polymer was repeatedly washed three times and dried in vacuum to constant weight. The molecular weight and molecular weight distribution of the polymer were determined by gel chromatography. The test results are shown in Table 1.

Figure 5:
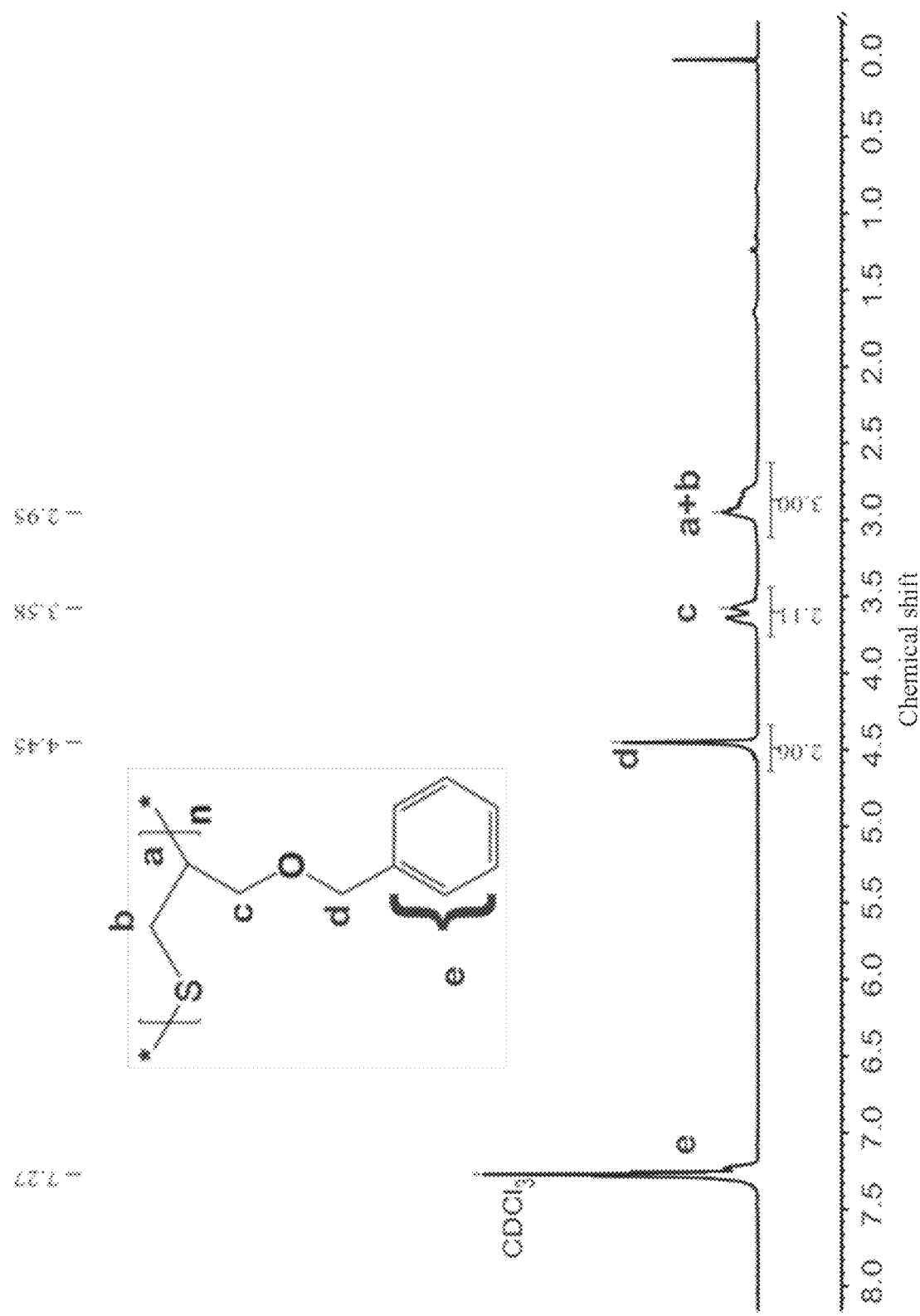
FIG. 5 is a $^1$H NMR spectrum of polythioether prepared in example 14.

The $^1$H NMR spectrum of the polythioether prepared in this example is shown in FIG. 5. It can be seen from FIG. 5 that polythioether is successfully synthesized; FIG. 5 shows the peak position and integral area of each hydrogen atom on the chain unit of thioether.

Example 15 Synthesis of Polythioether from COS/OX

Before polymerization reaction, water in a 10 mL autoclave was removed at 110° C. for about 2 hours, and the autoclave was cooled to room temperature in a dryer; certain amounts of catalyst 2 dodecyltrimethyl ammonium bromide (DTMeAB) were added to the autoclave in sequence; a molar ratio of catalyst 2 to OX (oxetane) was 1/500; then COS, OX (a molar ratio of COS to OX was 2:1) and 1 mL trichlorobenzene were added. Then, the autoclave was closed and put into 160° C. oil bath to react for 2 h under the self-generated pressure. After the reaction was ended, the autoclave was cooled to room temperature. The crude product was dissolved with tetrahydrofuran, and then the polymer was precipitated out in the mixture of ethanol/deionized water/hydrochloric acid. The polymer was repeatedly washed three times and dried in vacuum to constant weight. The molecular weight and molecular weight distribution of the polymer were determined by gel chromatography. The test results are shown in Table 1.

Example 16 Synthesis of Polythioether from $CS_2$/3-Chloromethyl-3-Methyl Oxetane Before polymerization reaction, water in a 10 mL autoclave was removed at 110° C. for about 2 hours, and the autoclave was cooled to room temperature in a dryer; certain amounts of catalyst 1 bis(triphenylphosphoranyl) ammonium chloride ([PPN]Cl) were added to the autoclave in sequence; a molar ratio of the catalyst 1 to 3-chloromethyl-3-methyl oxetane was 1/500; then $CS_2$, 3-chloromethyl-3-methyl oxetane (a molar ratio of $CS_2$ to 3-chloromethyl-3-methyl oxetane was 2:1) and 1 mL dimethylformamide (DMF) were added. Then, the autoclave was closed and put into 160° C. oil bath to react for 1 h under the self-generated pressure. After the reaction was ended, the autoclave was cooled to room temperature. The crude product was dissolved with tetrahydrofuran, and then the polymer was precipitated out in the mixture of ethanol/deionized water/hydrochloric acid. The polymer was repeatedly washed three times and dried in vacuum to constant weight. The molecular weight and molecular weight distribution of the polymer were determined by gel chromatography. The test results are shown in Table 1.

| Number | Cl 单体[1] | 环氧化物[2] | T (° C.) | 催化剂[3] | 催化剂/环氧化物 | Cl/环氧化物 | 溶剂[6] | t (h) | $M_n$[7] (kg/mol) | PDI[8] |
|---|---|---|---|---|---|---|---|---|---|---|
| Comparative example 1 [9] | COS | PO | 60 | 1 | 1/50 | 2/1 | THF | 24 | — | — |
| Example 1 | COS | PO | 80 | 1 | 1/50 | 2/1 | THF | 5.0 | 1.0 | 1.6 |
| Example 2 | $CS_2$ | PO | 80 | 2 | 1/500 | 2/1 | THF | 2.0 | 5.5 | 2.0 |
| Example 3 | $CS_2$ | PO | 130 | 2 | 1/500 | 2/1 | THF | 2.0 | 78.5 | 1.1 |
| Example 4 | $CS_2$ | PO | 130 | 2 | 1/500 | 10/1 | THF | 2.0 | 8.5 | 1.5 |
| Example 5 | $CS_2$ | PO | 130 | 2 | 1/10 | 2/1 | THF | 2.0 | 5.5 | 1.1 |
| Example 6 | COS | PO | 150 | 3 | 1/250 | 2/1 | THF | 1.0 | 100.0 | 1.3 |
| Example 7 | COS | PO | 150 | 4 | 1/100 | 1/1 | DMF | 2.0 | 56.8 | 1.5 |
| Example 8 | COS | PO | 180 | 5 | 1/50 | 2/1 | — | 0.5 | 88.0 | 1.1 |
| Example 9 | $CS_2$ | PO | 130 | 6 | 1/5000 | 2/1 | THF | 12.0 | 6.0 | 1.4 |

-continued

| Number | Cl 单体[1] | 环氧化物[2] | T (° C.) | 催化剂[3] | 催化剂/环氧化物[4] | Cl/环氧化物[5] | 溶剂[6] | t (h) | $M_n$[7] (kg/mol) | PDI[8] |
|---|---|---|---|---|---|---|---|---|---|---|
| Example 10 | CS$_2$ | CHO | 150 | 6 | 1/500 | 5/1 | THF | 8.0 | 10.0 | 1.2 |
| Example 11 | CS$_2$ | PGE | 150 | 1 | 1/500 | 2/1 | THF | 8.0 | 13.5 | 1.3 |
| Example 12 | COS | StO | 150 | 2 | 1/500 | 2/1 | THF | 12.0 | 13.0 | 1.2 |
| Example 13 | CS$_2$ | EO | 160 | 2 | 1/500 | 5/1 | Trichloro benzene | 10.0 | 53.0 | 1.5 |
| Example 14 | COS | Benzyl glycidyl ether | 150 | 1 | 1/500 | 1/1 | Toluene | 8.0 | 5.0 | 1.4 |
| Example 15 | COS | OX | 160 | 2 | 1/500 | 2/1 | Trichloro benzene | 2.0 | 55.0 | 1.5 |
| Example 16 | CS$_2$ | 3-chloromethyl-3-methyl oxetane | 160 | 1 | 1/500 | 2/1 | DMF | 1.0 | 45.3 | 1.4 |

[1] types of sulfur-carbon compounds;
[2] types of oxygen-containing compounds, which can be completely converted;
[3] types of catalysts: 1 is bis(triphenylphosphoranyl) ammonium chloride ([PPN]Cl), 2 is dodecyltrimethyl ammonium bromide (DTMeAB), 3 tetraphenyl phosphonium chloride (PPh$_4$Cl), 4 is 1,8-diazabicyclo[5.4.0]undec-7-carbene (DBU), 5 sodium methoxide (CH$_3$ONa), 6 potassium tert-butoxide (t-BuOK);
[4] a molar ratio of catalyst to epoxide;
[5] a molar ratio of sulfur-carbon compound to oxygen-containing monomer;
[6] types of solvents: THF: tetrahydrofuran , DMF: dimethylformamide, trichlorobenzene, toluene;
[7] Mn: number average molecular weight, determined by gel permeation chromatography;
[8] PDI: molecular weight distribution, determined by gel permeation chromatography;
[9] temperature below 80° C., polythioether is not generated, and the product is polythiocarbonate.

It can be seen from the above results that:

Examples 1~16 are results for generating polythioether by catalyzing polymerization of COS or CS$_2$ and epoxide with different catalysts. It can be seen from the above results that this synthesis method has high activity (i.e., oxygen-containing compounds are all completely converted) and universality.

The above descriptions are only several specific embodiments of the disclosure. It should be noted that, persons of ordinary skill in the art can make many deformations and improvements, all the deformations or improvements which do not go beyond the claims should be deemed as the protective scope of the disclosure.

We claim:

1. A method for preparing aliphatic polythioether, which is obtained by polymerization reaction using a sulfur-carbon compound and an oxygen-containing monomer as raw materials and using only bis(triphenylphosphoranyl) ammonium chloride as a catalyst;
   the polymerization reaction is performed under a self-generated pressure at 130~180° C.;
   a molar ratio of the sulfur-carbon compound to the oxygen-containing monomer is 1 5:1;
   a molar ratio of the catalyst to the oxygen-containing monomer is 1:10~500;
   the sulfur-carbon compound is selected from at least one of carbon disulfide and carbon oxysulfide;
   the oxygen-containing monomer is selected from at least one of epoxide, oxetane and 3-substituted oxetane.

2. The method for preparing aliphatic polythioether according to claim 1,
   wherein the epoxide is ethylene oxide;
   the 3-substituted oxetane is selected from at least one of 3,3-dimethlyoxetane, 3-methyl-3-benzyloxymethyl-oxetane,3-chloromethyl-3-methlyxetane,3-methyl-3-oxetane methanol,3-oxetanone, 3-(allyloxy) oxetane and 3-bromooxetane.

3. The method for preparing aliphatic polythioether according to claim 1, wherein the polymerization reaction is bulk polymerization.

4. The method for preparing aliphatic polythioether according to claim 1, wherein the polymerization reaction is solution polymerization, a solvent is dichloromethane.

5. The method for preparing aliphatic polythioether according to claim 1, specifically comprising:
   polymerizing in a high-pressure reactor under dry and oxygen-free conditions by using the sulfur-carbon compound and the oxygen-containing monomer as polymerization monomers and using the Lewis base as the catalyst, followed by adding alcohol-hydrochloric acid solution and posttreating to obtain the aliphatic polythioether.

* * * * *